United States Patent
Tom et al.

(10) Patent No.: US 10,940,426 B2
(45) Date of Patent: Mar. 9, 2021

(54) ADSORBENT-ASSISTED STABILIZATION OF HIGHLY REACTIVE GASES

(71) Applicant: NUMAT TECHNOLOGIES, INC., Skokie, IL (US)

(72) Inventors: Glenn M. Tom, Bethany Beach, DE (US); Paul Wai-Man Siu, Evanston, IL (US); Jose Arno, Portland, OR (US); Omar K. Farha, Morton Grove, IL (US); Ross Verploegh, Buffalo Grove, IL (US)

(73) Assignee: NUMAT TECHNOLOGIES, INC., Skokie, IL (US)

(*) Notice: Subject to any disclaimer, the term of this patent is extended or adjusted under 35 U.S.C. 154(b) by 183 days.

(21) Appl. No.: 16/139,958

(22) Filed: Sep. 24, 2018

(65) Prior Publication Data
US 2019/0091620 A1  Mar. 28, 2019

Related U.S. Application Data

(60) Provisional application No. 62/562,718, filed on Sep. 25, 2017.

(51) Int. Cl.
| | | |
|---|---|---|
| B01D 53/02 | (2006.01) | |
| B01J 20/22 | (2006.01) | |
| F17C 11/00 | (2006.01) | |
| B01J 20/20 | (2006.01) | |
| B01D 53/04 | (2006.01) | |
| B01J 20/28 | (2006.01) | |

(52) U.S. Cl.
CPC ......... *B01D 53/02* (2013.01); *B01D 53/0415* (2013.01); *B01J 20/20* (2013.01); *B01J 20/226* (2013.01); *B01J 20/28078* (2013.01); *F17C 11/00* (2013.01); *B01D 2253/102* (2013.01); *B01D 2253/204* (2013.01); *B01D 2253/25* (2013.01); *B01D 2253/308* (2013.01); *B01D 2257/204* (2013.01); *B01D 2257/40* (2013.01); *B01D 2257/553* (2013.01); *B01D 2257/93* (2013.01)

(58) Field of Classification Search
CPC .... B01D 53/02; B01D 53/04; B01D 53/0415; B01J 20/226; B01J 20/28; B01J 20/28078; F17C 11/00
See application file for complete search history.

(56) References Cited

U.S. PATENT DOCUMENTS

| | | | |
|---|---|---|---|
| 5,993,766 A * | 11/1999 | Tom | C01B 6/10 206/0.7 |
| 9,138,720 B2 | 9/2015 | Kim et al. | |
| 9,427,722 B2 | 8/2016 | Weston et al. | |
| 9,925,516 B2 | 3/2018 | Fuller et al. | |
| 2005/0192175 A1 | 9/2005 | Yaghi et al. | |
| 2006/0008392 A1 | 1/2006 | Graham et al. | |
| 2006/0060817 A1 | 3/2006 | Tempel et al. | |
| 2011/0217217 A1 | 9/2011 | Bandosz et al. | |
| 2015/0034500 A1 | 2/2015 | Kim et al. | |
| 2015/0105250 A1 | 4/2015 | Weston | |
| 2016/0151762 A1 | 6/2016 | Fuller et al. | |
| 2016/0160348 A1 | 6/2016 | Siu et al. | |
| 2017/0203277 A1 | 7/2017 | Kim et al. | |

FOREIGN PATENT DOCUMENTS

| | | |
|---|---|---|
| CN | 1719092 A | 1/2006 |
| CN | 1769760 A | 5/2006 |
| CN | 104549164 A | 4/2015 |
| CN | 105813711 A | 7/2016 |
| WO | WO2002088148 A1 | 11/2002 |
| WO | WO 2017-004682 A1 | 1/2017 |

OTHER PUBLICATIONS

Notification Concerning Transmittal of International Preliminary Report on Patentability and Written Opinion of the International Searching Authority for International Patent Application No. PCT/US2018/052404, dated Apr. 9, 2020, 10 pages.
International Search Report and Written Opinion of the International Searching Authority for International Patent Application No. PCT/US2018/052404, dated Mar. 27, 2019, 14 pages.
China National Intellectual Property Administration (CNIPA) First Office Action and Search Report for PRC (China) Patent Application No. 201880060852.6, dated Jan. 14, 2021, 7 pages.

* cited by examiner

*Primary Examiner* — Renee Robinson
(74) *Attorney, Agent, or Firm* — The Marbury Law Group, PLLC

(57) ABSTRACT

A method of adsorbing a highly reactive gas onto an adsorbent material comprising adsorbing the highly reactive gas to the adsorbent material. The adsorbent material comprises at least one Lewis basic functional group, or pores of a size to hold a single molecule of the highly reactive gas, or inert moieties which are provided to the adsorbent material at the same time at the same time as the highly reactive gas, prior to adsorbing the highly reactive gas or after adsorbing the highly reactive gas, or the highly reactive gas reacts with moieties of the adsorbent material resulting in passivation of the adsorbent material. A rate of decomposition of the adsorbed highly reactive gas is lower than a rate of decomposition for the neat gas at equal volumetric loadings and equal temperatures for both the adsorbed highly reactive gas and the neat gas.

10 Claims, 4 Drawing Sheets

Mn$_3$(BDC)$_3$

Mg(pyrazole-dicarboxylate)

Zn$_4$(O)(BDC-NH$_2$)$_3$

CuSiF6

MIL-53-Al

UiO-66

Mg-MOF-74

HKUST-1

ADSORBENT-ASSISTED STABILIZATION OF HIGHLY REACTIVE GASES

FIELD

The present invention is directed to the adsorption-based storage of highly reactive gases which provide stabilization and lowers the rate of gas decomposition and in-situ impurity generation. As an example, the embodiments are directed toward the stabilization of highly reactive gases including arsine ($AsH_3$), phosphine ($PH_3$), stibine ($SbH_3$), borane ($BH_3$), diborane ($B_2H_6$), halides, germane, digermane, silane, disilane, hydrazine and nitrogen trifluoride.

BACKGROUND

Highly reactive gases currently require storage at diluted concentrations or storage at cryogenic temperatures to mitigate decomposition, explosion, or deflagration. Dilution is the most often preferred method of storage and can be achieved either by using diluted gas mixtures, as is the case with 5% diborane stored in bulk hydrogen, or by gas storage at low pressures, as in germane or digermane. As a result of highly reactive gas dilution, the volumetric loading of the highly reactive gas is limited.

SUMMARY

An embodiment is drawn to a method of adsorbing a highly reactive gas onto an adsorbent material comprising adsorbing the highly reactive gas to the adsorbent material. The adsorbent material comprises at least one Lewis basic functional group, or pores of a size to hold a single molecule of the highly reactive gas, or inert moieties which are provided to the adsorbent material at the same time as the highly reactive gas, prior to adsorbing the highly reactive gas or after adsorbing the highly reactive gas, or the highly reactive gas reacts with moieties of the adsorbent material resulting in passivation of the adsorbent material. A rate of decomposition of the adsorbed highly reactive gas is lower than a rate of decomposition for the neat gas at equal volumetric loadings and equal temperatures for both the adsorbed highly reactive gas and the neat gas.

Another embodiment is drawn to a method of adsorbing a highly reactive gas onto a metal-organic framework (MOF) including providing the highly reactive gas to the MOF, wherein the gas and the MOF form a labile Lewis acid-base adduct which lowers a rate of decomposition of the highly reactive gas relative to a rate of decomposition of the neat highly reactive gas at the same temperature and same volumetric loadings.

Another embodiment is drawn to a method of adsorbing a highly reactive gas onto a metal-organic framework (MOF) comprising providing the highly reactive gas to the MOF, wherein, the pores of the MOF are sized to hold one molecule of the highly reactive gas.

Another embodiment is drawn to a method of adsorbing a highly reactive gas onto a metal-organic framework (MOF) comprising reacting an initial dose of the highly reactive gas with the MOF, wherein the initial dose of the highly reactive gas passivates the MOF during the first adsorption cycle so that a rate of decomposition of the adsorbed gas during subsequent adsorption cycles is lower than a rate of decomposition of the adsorbed gas during the first adsorption cycle and adsorbing an additional dose of the highly reactive gas to the MOF subsequent to the initial dose.

Another embodiment is drawn to a method of adsorbing a highly reactive gas onto a metal-organic framework (MOF) comprising reacting a fluid different from the highly reactive gas with the adsorbent material, wherein the fluid passivates the adsorbent such that a rate of decomposition of the reactive adsorbed gas is lower than a rate of decomposition for the neat gas at equal volumetric loadings and equal temperatures for both adsorbed gas and neat gas and adsorbing the highly reactive gas to the MOF.

Another embodiment is drawn to a gas storage and dispensing apparatus for a highly reactive gas comprising a container and an adsorbent material located in the container. The adsorbent material comprises at least one Lewis basic functional group, inert moieties which do not chemically react with the highly reactive gas, or pores of a size to hold a single molecule of the highly reactive gas, or moieties which react with the highly reactive gas resulting in passivation of the adsorbent material.

Another embodiment is drawn to a method of adsorbing a highly reactive gas onto an adsorbent material comprising adsorbing a highly reactive gas to the adsorbent material and adsorbing inert moieties to the adsorbent material at the same time as the highly reactive gas, prior to adsorbing the highly reactive gas or after adsorbing the highly reactive gas. A rate of decomposition of the adsorbed highly reactive gas is lower than a rate of decomposition for the neat gas at equal volumetric loadings and equal temperature for both the adsorbed highly reactive gas and neat gas.

DETAILED DESCRIPTION

Figure 1:
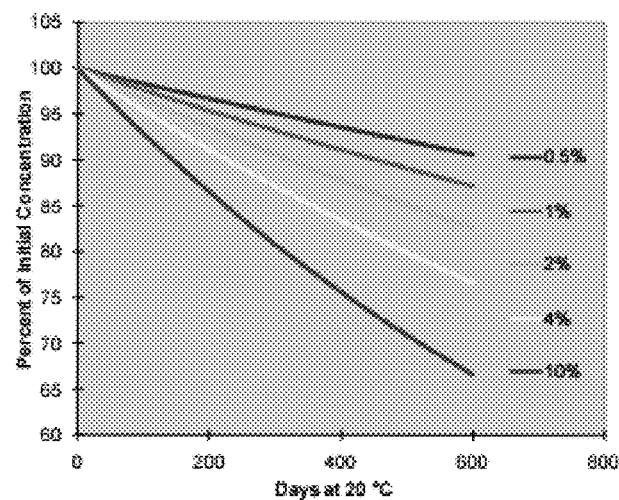
FIG. 1 is a graph of the decomposition of diborane as a function of diborane concentration.

Highly reactive gases can be defined as a category of gases which spontaneously decompose upon shock, high pressure, or high temperature. These gases can include: arsine ($AsH_3$), stibine ($SbH_3$), phosphine ($PH_3$), borane ($BH_3$), diborane ($B_2H_6$), halides, germane, digermane, silane, disilane, hydrazine or nitrogen trifluoride. For example, diborane, widely used as a dopant in semiconductor fabrication, is a highly reactive molecule that readily decomposes and reacts at ambient temperature to form higher order boranes, such as $B_5H_9$ and $B_{10}H_{14}$, as well as hydrogen gas. As a result, neat diborane is typically shipped and stored under significant refrigeration (<−75° C.) to slow the inherent thermal decomposition. Another decomposition mitigation method includes storing diborane by diluting it with hydrogen or nitrogen, typically to 5% $B_2H_6$ or less by volume. The decomposition of diborane increases as the concentration of diborane increases as illustrated in FIG. 1, which is a plot of the estimated diborane concentration versus time at various diborane concentrations. As a result of the needed dilution to mitigate decomposition, storage capacity is lost as is the ability to customize higher diborane mixtures for end users.

Figure 4:
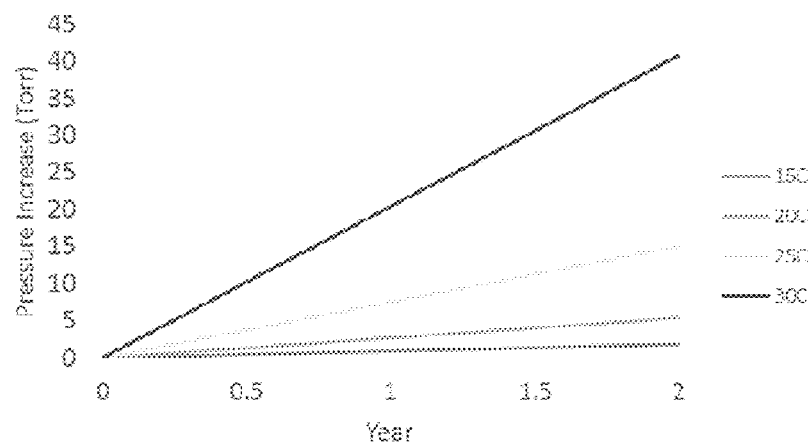
FIG. 4 is a graph of the decomposition of adsorbed arsine measured as a function of temperature.

In an embodiment, a highly reactive gas is adsorbed onto a porous material. As a result of adsorption, the rate decomposition of the highly reactive gas is lower than the rate of decomposition of the neat highly reactive gas, at similar volumetric loadings and similar temperatures. In effect, the adsorption of the highly reactive gas acts to stabilize and mitigate inherent decomposition. This effect is shown in the relative rate of the decomposition of adsorbed arsine as illustrated in FIG. 4 as a function of an estimated arsine pressure change versus time at various temperatures. Arsine thermally decomposes into arsenic and hydrogen according to Equation 1 below.

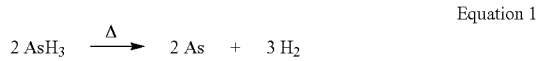

Equation 1

$$2 AsH_3 \xrightarrow{\Delta} 2 As + 3 H_2$$

The activation energy for the decomposition of arsine at a bulk density of 5.5 mmol/mL and at 25° C. is 150 kJ/mol and 134 kJ/mol for adsorbed arsine and neat arsine, respectively.

In preferred embodiments, the type of adsorbent used is a metal-organic framework (MOF). MOFs are a class of sorbents, much like zeolites or activated carbon. However, MOFs are composed of metal nodes and organic linkers, as shown in FIGS. 5A-5C and 6A-6E. In the various embodiments described herein, the MOFs of FIGS. 5A-5C and 6A-6E can be used or any other suitable MOFs can be used. The combination of metal nodes and organic linkers provide a vast array of near countless types of possible structures. For example, the MOFs shown in FIGS. 5A-5C may be used to stabilize $B_2H_6$ (or other reactive gases) while the MOFs shown in FIGS. 6A, 6D and 6E may be used to stabilize other reactive gases. In other embodiments, other adsorbents, such as activated (i.e., porous) carbon or porous organic polymers (POP) may be used.

In an embodiment, the adsorbent material comprises a porous organic polymer (POP) comprising a polymerization product from at least a plurality of organic monomers and comprising at least a plurality of linked organic repeating units. In an alternative embodiment, the adsorbent material comprises a porous carbon. However, in preferred embodiments the adsorbent material comprises a MOF.

In a first embodiment, a Lewis acid or Lewis base on gas storage sites in the MOF is provided. In particular, the tunability of the organic linker allows for the adsorption surfaces of the MOFs or POPS or activated carbon to include various Lewis acidic and/or Lewis basic functional groups. In an embodiment, the MOF, POP or activated carbon includes one or more Lewis basic functional groups and the highly reactive gas acts as a Lewis acid. In this embodiment, the Lewis basic functional group in the MOF donates electrons to the highly reactive gas, forming a dative bond and thereby stabilizing the highly reactive gas. Lewis basic functional groups may include, but are not limited to, any form or types of amines, amides, imines, azo groups, azides, ethers, carbonyls, alcohols, alkoxides, thiols, thiolates, isothiocyanates, sulfides, sulfates, sulfites, sulfoxides, sulfones, disulfides, nitriles, isonitriles, carboxylates, nitro groups, phosphates, phosphines, phosphinates, borates, halides, aromatic groups (such as heterocycles) alkynes, or alkenes. Exemplary heterocycles (i.e. heterocyclic molecules) include 5 or 6 member rings having 1, 2 or 3 non-carbon atoms selected from one or more of P, Se, Sb, N, S, Bi, O or As on the ring.

Figure 5A:
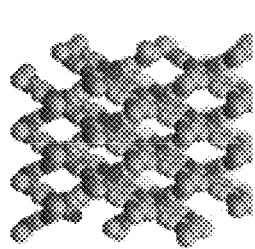
FIGS. 5A-5B are ball and stick illustrations of some metal-organic frameworks (MOFs) with preferred pore sizes for stabilizing diborane.
Figure 5B:
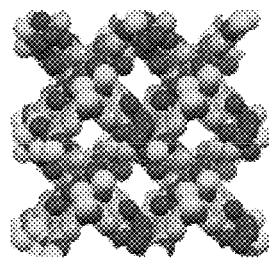
Figure 5C:
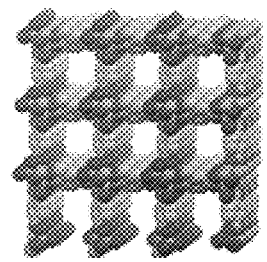
FIG. 5C is a ball and stick illustration of a MOF with Lewis base groups.
Figure 6A:
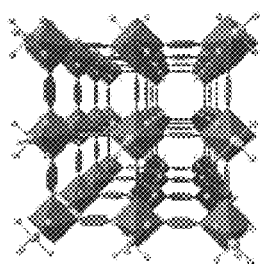
FIGS. 6A-6E are ball and stick illustrations of the crystalline structures of other metal-organic frameworks (MOFs).
Figure 6B:
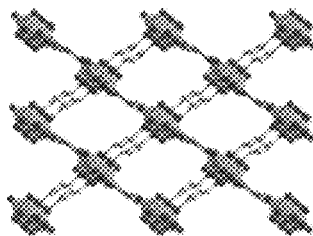
Figure 6C:
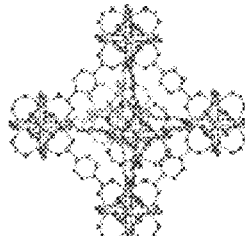
Figure 6D:
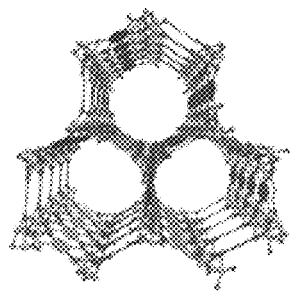
Figure 6E:
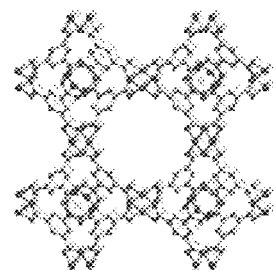

The addition of uniform, well placed Lewis acidic and/or Lewis basic functional groups enables the stabilization of highly reactive gases. Such is the case with diborane. When in the presence of a Lewis base on the MOF, POP or activated carbon storage site, diborane will homolytically cleave into two borane molecules and form two Lewis acid-Lewis base pair that are more stable than an uncleaved diborane molecule. This is observed in borane adducts such as $BH_3$.THF (tetrahydrofuran), a liquid typically stored between 0-50° C. to mitigate decomposition. Analogously, borane adducts formed on the functionalized surfaces of metal-organic frameworks lower the rate of decomposition of the diborane precursor. Upon exposure to external stimuli, including mild heat and/or vacuum, the borane adducts cleave, the borane recombines to form diborane, and diborane is released or desorbed from the sorbent. FIG. 5C illustrates an exemplary MOF $Zn_4(O)(BDCNH_2)_3$, where BDC is benzene dicarboxylate, which contains a Lewis base.

In another embodiment, the stabilization of adsorbed highly reactive gases is accomplished through molecular segregation. In this embodiment, the MOF, POP or activated carbon is engineered to have at least some pores which hold a maximum of one molecule of reactive gas. That is, at least some of the pores in the MOF, POP or activated carbon have a pore size that is greater than the diameter of the reactive gas molecule and less than twice the diameter of the reactive gas molecule, such as between 1.1 and 1.5 times the diameter of the reactive gas molecule. Given the crystalline nature of MOFs, pore sizes can be precisely tuned to accommodate only one molecule of highly reactive gas. Accommodation, for example, a single molecule of diborane results in the stabilization of diborane. As mentioned above, diborane thermally decomposes and reacts with other diborane molecules to form higher order borane compounds and hydrogen gas (see equation 2 below and FIG. 1).

Equation 2

$$5 B_2H_6 \xrightarrow{\Delta} 2 B_5H_9 + 6 H_2$$

Figure 2:
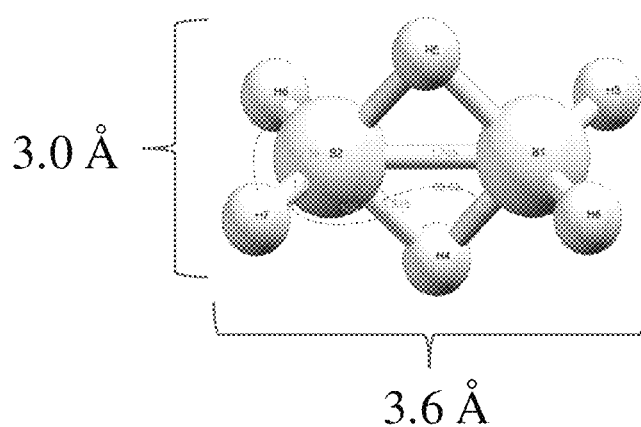
FIG. 2 is a ball and stick model of the Van der Waals geometry of diborane.
Figure 3:
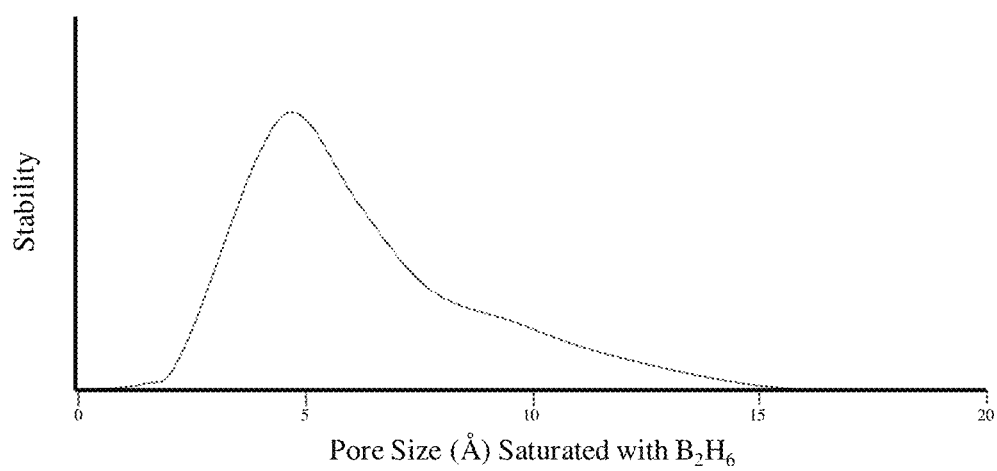
FIG. 3 is a graph illustrating the stability of fully adsorbed diborane as a function of pore size.

By segregating the diborane molecules, chemical collisions are diminished and the rate of diborane decomposition is reduced. Diborane has a van der Waals diameter of 3.6 Å, but the width of diborane is approximated at 3.0 Å, as illustrated in FIG. 2. As a result of the size of diborane, the stability of adsorbed diborane is illustrated in FIG. 3 as a conceptual illustration as a function of the pore size where the diborane fully fills the pore of the adsorbent. As shown in FIG. 3, the stability of the highly reactive diborane gas increases as the pore size increases. The maximum stability is estimated to be at a pore size of approximately 5 Å. Once the pore size increases beyond 7.2 Å, the pore may accommodate multiple diborane molecules and therefore the stability decreases. Thus, the preferred pore size for diborane is 4-6 Å. Examples of MOFs having a suitable pore size include the following MOFs shown in FIGS. 5A, and 5B: $Mn_3(BDC)_3$ and Mg(pyrazole dicarboxylate).

In another embodiment, the stability of the adsorbed highly reactive gas increases after the adsorbent material is passivated. In an embodiment, this is achieved by treating the adsorbent material with the highly reactive gas to modify sensitive moieties in the adsorbent material to make the adsorbent less reactive to the highly reactive gas. This method may comprise reacting an initial dose of the highly reactive gas with the MOF, POP or activated carbon to passivate the MOF, POP or activated carbon during the first adsorption cycle followed by removing passivation byproducts formed by reaction of the highly reactive gas with the MOF, POP or activated carbon along with the sensitive moieties of the MOF, POP or activated carbon. After removing the passivation byproducts the method includes adsorbing additional highly reactive gas to the MOF, POP or activated carbon subsequent to the initial dose to store the gas in the MOF, POP or activated carbon. In an embodiment, elevated temperatures (e.g. higher than room temperature) and/or higher pressures (e.g. higher than 1 atm) can be used to accelerate the passivation reactions.

Example sensitive moieties may include, but are not limited to: 1) acidic moieties such as open-metal coordination sites, carboxylic acid sites, or acidic cluster sites; 2) reducing agents such as amines, incorporated metals, oxalic acid, formic acid, or phosphites; and 3) oxidizing agents such as oxygenated clusters, metal oxides, or peroxides. With the sensitive moieties passivated, the highly reactive gas and other potential impurities are desorbed. After subsequent highly reactive gas adsorption cycles, the rate of decomposition is diminished given the passivation of the sensitive adsorption moieties.

In an alternative embodiment, the passivation can be achieved by using a different fluid, such as a strong oxidizer (such as, but not limited to, oxygen, chlorine, fluorine, or hydrogen peroxide) or reducing agent (such as, but not limited to, hydrogen, ammonia, sulfur dioxide) rather than the reactive gas used for storage. This method includes reacting the fluid (e.g. a gas) different from the highly reactive gas with the adsorbent material to passivate the adsorbent and then subsequently adsorbing the highly reactive gas to the adsorbent material. Selection of the desired concentration, pressure and temperature can be used to modulate the reaction rates. Modulation of the reaction rates may be used to achieve a desired passivation time or to prevent too aggressive of a reaction that would undesirably degrade the MOF, POP or activated carbon. The passivating fluid is preferably selected based on its ability to produce reaction byproduct with the sensitive moieties that can be removed easily. Once the MOF, POP or activated carbon is passivated, the reactive fluid and any reaction byproducts are removed from the vessel. In an embodiment, removal of the byproducts may be aided by application of a vacuum and/or application of heat. The vessel can be filled with the highly reactive gas to adsorb it to the MOF, POP or activated carbon after removal of the byproducts.

As an example, fluorine gas at a reduced concentration (5 vol %) may be introduced at a pressure of 1 atmosphere in the vessel containing a MOF. Fluorine gas is a strong oxidizer that reacts with reactive C—OH moieties present on the MOF surfaces to produce gaseous HF and $OF_2$ reaction products, resulting in the replacement of the MOF C—OH sites with more stable C—F bonds.

In another embodiment, molecular segregation of a highly reactive gas in an adsorbent material, such as a MOF, POP or activated carbon, is accomplished by providing inert moieties into the pores of the adsorbent material in addition to the reactive gas. As used herein, an inert moiety is an atom or molecule which does not chemically react with the highly reactive gas. As used herein, "moieties" means plural atoms or molecules having the same composition or different composition.

In one embodiment, the inert moieties are adsorbed in (e.g., onto) the pores by van der Waals forces. Preferably, the inert moieties are not chemically bound to the adsorbent material.

The inert moieties are selected based on the reactivity of the adsorbed highly reactive gas and the lack of chemical reaction with the highly reactive gas. By way of example, examples of inert moieties for diborane may include, but are not limited to hydrogen, helium, nitrogen, aliphatic alkanes that comprise only of carbon and hydrogen atoms, such as hexane, and aromatic rings that comprise only of carbon and hydrogen atoms, such as benzene. In addition to van der Waal forces, some inert moieties (e.g., inert molecules) may fill the empty space due to capillary condensation.

Without wishing to be bound by a particular theory, the present inventors believe that the presence of inert moieties in the pores of the adsorbent material diminishes the chemical collisions between the highly reactive gas molecules (e.g., between diborane molecules) and the rate of decomposition of the highly reactive gas is reduced. In other words, it is believed that the inert moieties (e.g., helium atoms) limits the movement of the highly reactive gas molecules (e.g., diborane molecules).

Without wishing to be bound by a particular theory, the present inventors believe that the presence of the inert moieties increases the free energy of disassociation of the highly reactive gas, which reduces the rate of decomposition of the highly reactive gas. For example, biased Born-Oppenheimer molecular dynamic (BOMD) simulations with energies computed from density functional theory (DFT) can be used to calculate the free energy necessary for the dissociation of diborane into boranes (Equation 3) within the pores of the adsorbent material:

$$B_2H_6 \rightarrow 2BH_3 \qquad \text{Equation 3}$$

This is believed to be the first step in the thermal decomposition of diborane and that a higher free energy barrier would result in a lower rate of decomposition. Introduction of inert moieties, such as helium molecules, into an adsorbent material, such as a MOF, is believed to increase the free energy required to dissociate diborane by 10-20 kJ/mol relative to only diborane adsorbed onto the same adsorbent material.

The highly reactive gas and the inert moieties may be added to the adsorbent material in any order. In one embodiment, the highly reactive gas is provided into the adsorbent material first, for example to a maximum adsorption capacity of the adsorption material for the highly reactive gas, followed by providing the inert moieties into the adsorbent material. However, in other embodiments, the highly reactive gas and the inert moieties are provided into the adsorbent material at the same time, or the inert moieties are provided into the adsorbent material prior to the highly reactive gas.

In one embodiment, the pore size of at least some of the pores of the adsorbent material is selected to fit only one molecule of the highly reactive gas and one or more inert moieties (e.g., one or more helium atoms), as described in a prior embodiment.

In one or more of the above described embodiments, the highly reactive gas stored (e.g., adsorbed) in an adsorbent material contains at least one Lewis base, contains at least some pores that are sized to fit only one highly reactive gas molecule, is passivated and/or is filled with the inert moieties exhibits a lower pressure change over time than neat highly reactive gas. For example, the highly reactive gas stored (e.g., adsorbed) in an adsorbent material exhibits at least 50% less, such as 50% to 200% less pressure change (e.g., increase or decrease in pressure) over 8 days, than the same neat highly reactive gas at the same (i.e., equal) temperature (e.g., room temperature), the same (i.e., equal) volumetric loading and the same (i.e., equal) initial pressure.

In one embodiment, the highly reactive gas stored (e.g., adsorbed) in the above described adsorbent material has a less than 25%, such as 0% to 25%, for example 5% to 20% pressure change from an initial pressure over 8 days. In another embodiment, the highly reactive gas stored (e.g., adsorbed) in the above described adsorbent material does not exhibit an increase in pressure over at least 8 days, such as 8 to 14 days, at room temperature.

Figure 7:
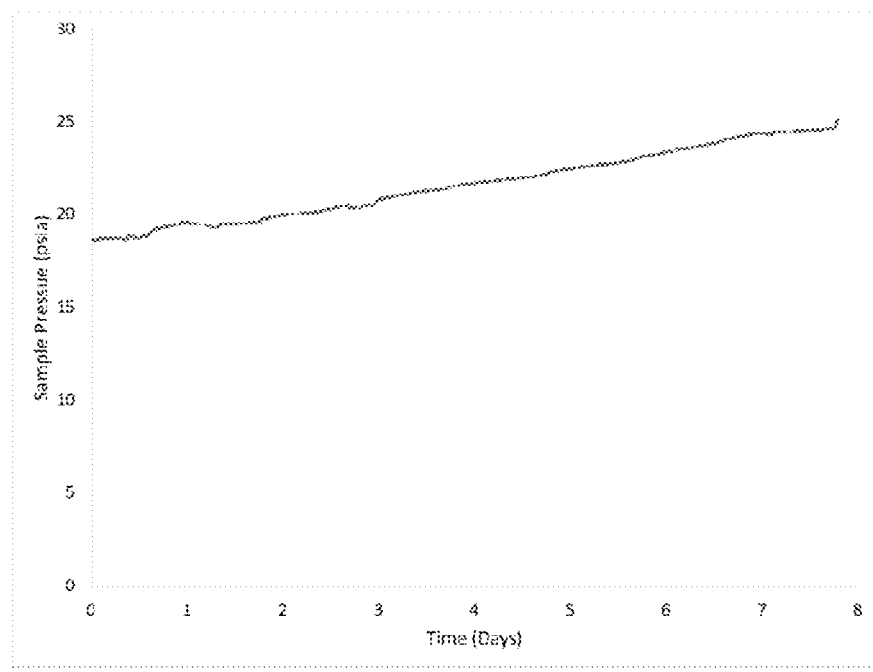
FIG. 7 is a graph of sample cell pressure change over time for a POP comprised of a polymerization product from styrene and a cross-linking agent filled with $B_2H_6$.

In one non-limiting example, a stainless-steel sample cell equipped with a pressure transducer and an isolation valve was loaded with a POP comprising a polymerization product of styrene and a divinyl benzene cross-linking agent. The POP is believed to include at least some pores that are sized to fit only one diborane molecule. Furthermore, the styrene POP precursor provides phenyl groups that are believed to behave as an aromatic Lewis base. The container was filled with $B_2H_6$ to 18.6 psia at ambient temperature (22° C.), resulting a volumetric loading of 1.4 mmol $B_2H_6$ per mL of POP. The sample cell was isolated from the $B_2H_6$ source and the sample pressure was monitored over time, as shown in FIG. 7. The effective pressure change was determined to be 0.6 psia $M^{-1}$ $day^{-1}$ which was lower than that of a neat $B_2H_6$ sample (1.6 psia $M^{-1}$ $day^{-1}$). The lower pressure change is believed to be evidence of a lower decomposition of diborane stored in a POP containing a Lewis base and at least some pores that are sized to fit only one diborane molecule.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of adsorbing a highly reactive gas onto a metal-organic framework (MOF) comprising:
    reacting an initial dose of the highly reactive gas with the MOF, wherein the initial dose of the highly reactive gas passivates the MOF in a first adsorption cycle so that a rate of decomposition of the adsorbed highly reactive gas during subsequent adsorption cycles is lower than a rate of decomposition of the adsorbed highly reactive gas during the first adsorption cycle; and
    adsorbing an additional dose of the highly reactive gas to the MOF subsequent to the initial dose.

2. The method of claim 1, wherein the adsorbed highly reactive gas is arsine ($AsH_3$), stibine ($SbH_3$), phosphine ($PH_3$), borane ($BH_3$), diborane ($B_2H_6$), halides, germane, digermane, silane, disilane, hydrazine or nitrogen trifluoride.

3. The method of claim 1, further comprising removing byproducts formed by the reaction of the initial dose of the highly reactive gas with the MOF prior to adsorbing the highly reactive gas to the MOF subsequent to the initial dose.

4. The method of claim 1, further comprising raising at least one of temperature or pressure to accelerate passivation of the MOF.

5. A gas storage and dispensing apparatus for a highly reactive gas comprising:
    a container; and
    an adsorbent material located in the container, wherein the adsorbent material comprises:
        inert moieties which do not chemically react with the highly reactive gas; and
    wherein a combination of the adsorbent material and the inert moieties is configured to provide a rate of decomposition of the adsorbed highly reactive gas lower than a rate of decomposition for a neat highly reactive gas that is not adsorbed at equal volumetric loadings and equal temperature for both the adsorbed highly reactive gas and the neat highly reactive gas.

6. The apparatus of claim 5, wherein the adsorbent material comprises a metal-organic framework (MOF).

7. The apparatus of claim 5, wherein the adsorbent material comprises a porous organic polymer (POP).

8. The apparatus of claim 5, wherein the adsorbent material comprises activated carbon.

9. The apparatus of claim 5, wherein the adsorbent material further comprises:
    at least one Lewis basic functional group; or
    pores of a size to hold a single molecule of the highly reactive gas.

10. The apparatus of claim 5, wherein the adsorbed highly reactive gas is arsine ($AsH_3$), stibine ($SbH_3$), phosphine ($PH_3$), borane ($BH_3$), diborane ($B_2H_6$), halides, germane, digermane, silane, disilane, hydrazine or nitrogen trifluoride.

* * * * *